United States Patent
Honkanen et al.

(10) Patent No.: US 8,161,295 B2
(45) Date of Patent: Apr. 17, 2012

(54) STORING OF DATA IN A DEVICE

(75) Inventors: Jukka-Pekka Honkanen, Tampere (FI); Jouni Mikkonen, Tampere (FI); Henry Haverinen, Jyväskylä (FI)

(73) Assignee: Nokia Corporation, Espoo (FI)

( * ) Notice: Subject to any disclaimer, the term of this patent is extended or adjusted under 35 U.S.C. 154(b) by 1050 days.

(21) Appl. No.: 11/091,364

(22) Filed: Mar. 17, 2005

(65) Prior Publication Data

US 2005/0223218 A1 Oct. 6, 2005

(30) Foreign Application Priority Data

Mar. 19, 2004 (FI) ..................................... 20045089

(51) Int. Cl.
*G06F 21/00* (2006.01)
(52) U.S. Cl. ........................... 713/192; 455/410; 380/44
(58) Field of Classification Search .................. 713/155, 713/189, 192, 193; 726/1–36; 710/101–103; 705/67; 709/229; 380/247–250, 4, 44; 455/558, 455/410
See application file for complete search history.

(56) References Cited

U.S. PATENT DOCUMENTS

| | | | |
|---|---|---|---|
| 5,144,665 A | | 9/1992 | Takaragi et al. |
| 5,907,616 A | * | 5/1999 | Brogger et al. .............. 713/172 |
| 5,987,139 A | * | 11/1999 | Bodin ............................ 380/44 |
| 6,085,323 A | * | 7/2000 | Shimizu et al. .............. 713/150 |
| 6,373,946 B1 | | 4/2002 | Johnston |
| 7,065,214 B2 | * | 6/2006 | Ishiguro et al. .............. 380/268 |
| 7,177,425 B2 | * | 2/2007 | Ben-Chuan et al. ............ 380/44 |
| 7,191,343 B2 | * | 3/2007 | Tuoriniemi et al. .......... 713/193 |
| 2001/0041593 A1 | * | 11/2001 | Asada .......................... 455/558 |
| 2002/0009199 A1 | * | 1/2002 | Ala-Laurila et al. .......... 380/247 |
| 2004/0180694 A1 | * | 9/2004 | Lai et al. ...................... 455/558 |
| 2004/0224664 A1 | * | 11/2004 | Guo ............................. 455/411 |

(Continued)

FOREIGN PATENT DOCUMENTS

EP 1059761 12/2000

(Continued)

OTHER PUBLICATIONS

Yong Li, in Chen, and Tie-Jun Ma, "Security in GSM", 2003, http://gsm-security.net/papers/securityingsm.pdf.*

(Continued)

*Primary Examiner* — Vivek Srivastava
*Assistant Examiner* — Hee Song
(74) *Attorney, Agent, or Firm* — Ware, Fressola, Van Der Sluys & Adolphson LLP

(57) ABSTRACT

Method for storing data in the memory (1.2) of an electronic device (1), wherein the data to be stored is encrypted with an encryption key (Ks). The electronic device (1) is provided with an identification card (2) equipped with a cryptographic algorithm and an individual identifier (ID). In the electronic device (1), at least one seed value (RAND1, RAND2, RAND3) is generated, and the at least one seed value is transmitted to the identification card (2). The cryptographic algorithm is performed on the identification card (2), with the seed value (RAND1, RAND2, RAND3) being used as the input, wherein at least one derived value (Kc1, Kc2, Kc3) is produced in the algorithm. The at least one derived value (Kc1, Kc2, Kc3) is transmitted to the electronic device (1), wherein the at least one derived value (Kc1, Kc2, Kc3) is used in the formation of the encryption key (Ks). The invention also relates to an electronic device (1), module, and computer software product.

20 Claims, 3 Drawing Sheets

U.S. PATENT DOCUMENTS

| | | | | |
|---|---|---|---|---|
| 2005/0070248 | A1* | 3/2005 | Gaur | 455/410 |
| 2007/0079142 | A1* | 4/2007 | Leone et al. | 713/193 |

FOREIGN PATENT DOCUMENTS

| | | | |
|---|---|---|---|
| EP | 1223506 A1 | * | 7/2002 |
| EP | 12223506 A1 | * | 7/2002 |
| GB | 2315195 | | 1/1998 |
| GB | 2315195 A | * | 1/1998 |
| WO | WO 99/25086 | * | 5/1999 |

OTHER PUBLICATIONS

H. Krawczyk, M. Bellare, and R. Canetti, "HMAC: Keyed-Hashing for Message Authentication", RFC2104, Network Working Group Request for Comments: 2104, Feb. 1997, http://www.org/rfc/rfc2104.txt.*

Yong Li, Lin Chen, and Tie-Jun Ma, "Security in GSM", 2003, http://gsm-security.net/papers/securityingsm.pdf.*

H. Krawczyk, M. Bellare, and R. Canetti, "HMAC: Keyed-Hashing for message Authentication," RFC2104, Network Working Group Request for Comments: 2104, Feb. 1997, http://www.org/rfc/rfc2104.txt.*

Beoit O. et al., "Mobile Terminal Security", Jul. 2004. http://eprint.iacr.org/2004/158.*

Yong Li, Lin Chen, and Tie-Jun Ma, "Security in GSM," 2003, http://gsm-security.net/papers/securityingsm.pdf.*

H. Krawczyk, M. Bellare, and R. Canetti, "HMAC: Keyed-Hashing for message Authentication," RFC2104, Network Working Group Request for Comments: 2104, Feb. 1997, http://www.org/rfc2104.txt.*

Beoit O. et al., "Mobile Terminal Security," Jul. 2004. http://eprint.iacr.org/2004/158.*

* cited by examiner

STORING OF DATA IN A DEVICE

CROSS-REFERENCE TO RELATED APPLICATIONS

This application claims priority under 35 USC §119 to Finnish Patent Application No. 20045089 filed on Mar. 19, 2004.

FIELD OF THE INVENTION

The present invention relates to a method for storing data in the memory of an electronic device, wherein the data to be stored is encrypted with an encryption key, and which electronic device is provided with an identification card equipped with a cryptographic algorithm and an individual identifier. The invention also relates to an electronic device comprising a memory and an identification card connection provided with an identification card equipped with a cryptographic algorithm and an individual identifier. The invention also relates to a module to be used in connection with an electronic device which comprises a memory and an identification card connection provided with an identification card equipped with a cryptographic algorithm and an individual identifier. Furthermore, the invention relates to a computer software product comprising machine executable program commands for storing data in the memory of an electronic device and for encrypting data to be stored with an encryption key, the electronic device being provided with an identification card equipped with a cryptographic algorithm.

BACKGROUND OF THE INVENTION

In modern portable electronic devices, it is possible to store various information. A part of the information may be such that the user does not wish it to be accessible to unauthorized persons. There is thus a need to encrypt this information in some way. Such information may include, for example, user identifications, passwords, addresses, personal data, client registers, application software, databases, etc. Present data encryption methods are normally based on a password. It may also be possible to transfer encrypted data to another device and open it also there if the correct password has been communicated. In some devices, it is possible to use data encryption by the device, wherein the device comprises the necessary functions to conceal the data. However, it is not possible or reasonable to implement such an arrangement in all devices, wherein encryption by software may be used. In encryption by software, an encryption algorithm is used, in which e.g. the user of the device enters an encryption key (a password), after which the data is encrypted by the encryption algorithm. The encrypted data can thus be decrypted in a corresponding manner with a decryption key and a decryption algorithm. In symmetric encryption, the encryption key and the decryption key are the same, as are often also the encryption algorithm and the decryption algorithm. In asymmetric encryption, however, different keys are used for encryption and decryption.

For reasons of safety, users typically select poor passwords which are easy to remember but which are, at the same time, vulnerable to various attacks. Furthermore, the passwords are often words of some language, proper names, dates, etc. Thus, the password can be determined, for example, by a so-called dictionary attack in which the dictionaries of one or more languages are used and, by trying words found in them, attempts are made to find out the correct password. Another alternative to find out the password is to try a mass of random passwords (the "brute force" method). If the length of the password is only a few characters, the above-mentioned method may be successful in finding the correct password relatively quickly with computers, or the like, which are nowadays available.

SUMMARY OF THE INVENTION

It is an aim of the present invention to provide improved encryption of data in connection with an electronic device. The invention is based on the idea that, for generating the encryption key, an identification card is used which contains a stored encryption algorithm. To put it more precisely, the method according to the present invention is primarily characterized in that in the electronic device, at least one seed value is generated, said at least one seed value is transmitted to the identification card, in which said cryptographic algorithm is performed with said seed value as the input, wherein, in the algorithm, at least one derived value is formed, and said at least one derived value is transmitted to the electronic device, wherein said at least one derived value is used for producing said encryption key. The electronic device according to the present invention is primarily characterized in that the electronic device comprises means for generating at least one seed value, means for transmitting said at least one seed value to an identification card comprising means for performing said cryptographic algorithm, said seed value being arranged to be used as the input, wherein at least one derived value is arranged to be formed by the algorithm, and the electronic device comprises means for receiving said at least one derived value, and means for using said at least one derived value for producing said encryption key. The module according to the present invention is primarily characterized in that the module comprises means for generating at least one seed value, means for transmitting said at least one seed value to an identification card comprising means for performing said cryptographic algorithm, said seed value being arranged to be used as the input, wherein at least one derived value is arranged to be formed by the algorithm, and the electronic device comprises means for receiving said at least one derived value, and means for using said at least one derived value for producing said encryption key. Furthermore, the software product according to the invention is primarily characterized in that the computer software product comprises machine executable program commands stored on a readable medium:
- for generating at least one seed value,
- for searching the data of a data group for at least one seed value used in the data encryption step,
- for transmitting said at least one seed value to an identification card, in which said cryptographic algorithm is arranged to be performed, with said seed value arranged to be used as the input, wherein at least one derived value is arranged to be formed by the algorithm, wherein the computer software product comprises machine executable program commands:
- for receiving said at least one derived value from the identification card, and
- for using said at least one derived value for producing said decryption key.

Advantages to be achieved by the invention include, for example, the following. The encryption arrangement according to the invention makes it possible to encrypt data in a relatively reliable way even in an electronic device, which is not equipped with any specialized data encryption hardware. The encryption according to the invention is very difficult to decrypt without installing the identification card used in the encryption, in connection with the electronic device. By means of the invention, it is also possible to prevent the decryption of encrypted data, copied into a second electronic device in an unauthorized way, in this second electronic device. In the encryption arrangement according to the invention, it is possible to use strong, sufficiently long encryption keys, wherein the decryption may be almost impossible in practice. Another advantage of the invention is that, for implementing the encryption arrangement, it is possible to use present identification cards, such as the SIM card (Subscriber Identity Module) of a mobile station, which already include the properties to produce encryption keys from seed numbers. However, the use of the encryption according to the invention does not require any measures by the provider of the identification card, even if existing identification cards were used.

DESCRIPTION OF THE DRAWINGS

In the following, the invention will be described in more detail with reference to the appended drawings, in which.

DETAILED DESCRIPTION OF THE INVENTION

In present mobile communication systems, such as the GSM system, a so-called SIM card (subscriber identity module), on which user-specific information is stored, is used as an identification card for the authentication of wireless communication devices complying with the mobile communication system. In the mobile communication system, this information contained in the SIM card is used to identify wireless communication devices and to prevent abuse. On the identification card, an algorithm for forming encryption keys is stored, which in the GSM system is the so-called A8 algorithm. Furthermore, an identification card specific internal key Ki is stored on the identification card. The mobile station inputs in the identification card a so-called seed number (seed value) RAND which it has received from the GSM network. The seed value is selected by the authentication centre (AuC) of the GSM network, and the seed value is normally a pseudo random number. On the identification card, the seed number and the identification card specific key Ki are input in the encryption key production algorithm A8 to produce a session specific encryption key Kc. The encryption key Kc is used by the mobile station for encrypting data to be transmitted to a base station as well as for decrypting encrypted data received from the base station. In this context, it should be mentioned that the above-mentioned seed number is not necessarily numerical data but it can also be a character string of another type.

Figure 1:
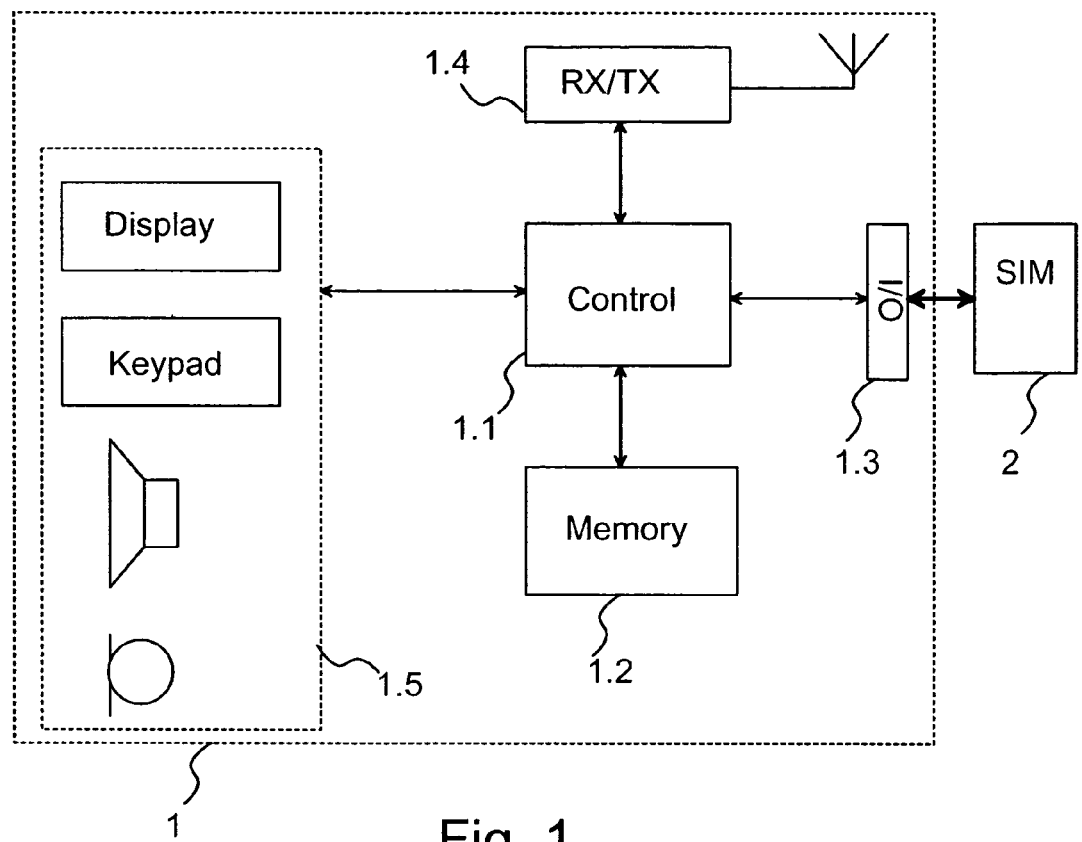
FIG. 1 shows an electronic device according to an embodiment of the invention in a reduced block chart.

In the following, the invention will be described by using, as an example of the electronic device 1, a mobile station of the GSM mobile communication system, and as an example of the identification card 2, the SIM card of the GSM mobile station, but it will be obvious that the invention is not limited solely to be used in GSM mobile stations but the invention can be applied in a number of various electronic devices, in connection with which an identification card can be used. The electronic device 1 of FIG. 1 comprises, for example, a control block 1.1 for controlling the functions of the electronic device 1. Furthermore, the electronic device 1 comprises a memory 1.2 for storing data, programs, etc., an identification card connection 1.3 for connecting the identification card 2 to the electronic device 1, mobile communication means 1.4, as well as a user interface 1.5. In the memory 1.2 of the electronic device, a memory space can be allocated for the storage of encrypted data.

Figure 2:
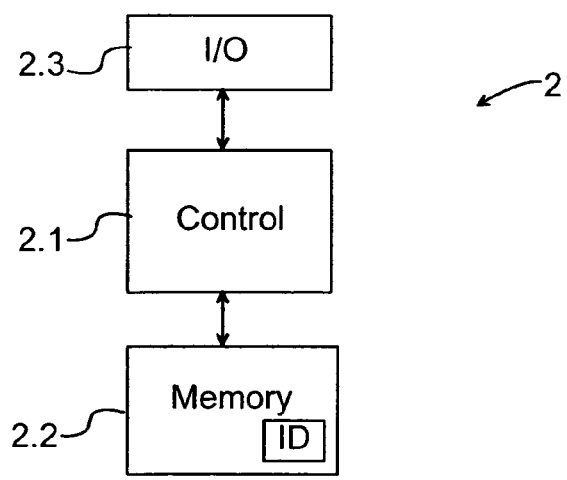
FIG. 2 shows an identification card to be used in connection with an electronic device according to an embodiment of the invention, in a reduced block chart.

FIG. 2 shows an example of the identification card 2 which, in this example, is a SIM card. The identification card 2 also comprises a control block 2.1 for controlling the functions of the identification card 2, and a memory 2.2 for storing data and program codes. The memory 2.2 is a storage for e.g. an algorithm, i.e., in practice, program commands for performing a computation according to the algorithm. The memory 2.2 also comprises a stored individual identifier ID, such as the international mobile subscriber identity IMSI. Furthermore, the identification card 2 comprises a connection 2.3, by means of which data can be transmitted between the electronic device 1 and the identification card 2. Furthermore, the operating voltage required by the identification card 2 can be transmitted via the connection 2.3.

It will be obvious that the identification card 2 does not necessarily need to be coupled physically to the electronic device 1, but also wireless data transmission can be used between the electronic device 1 and the identification card 2, the operating principles of the invention still remaining essentially similar. Thus, in a way known as such, the identification card connection 1.3 of the electronic device 1 and the connection 2.3 of the identification card comprise transceivers which make wireless data transmission possible.

Figure 3A:
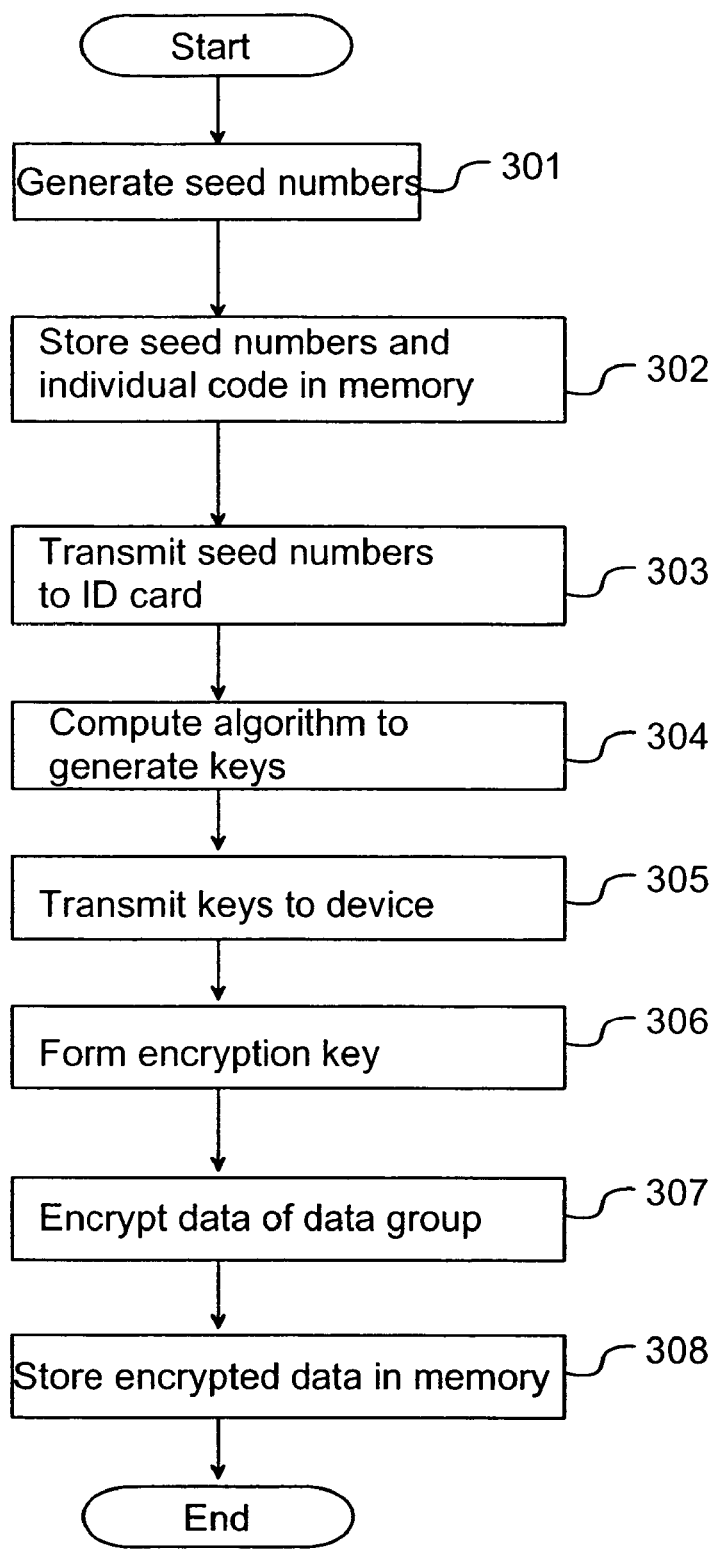
FIG. 3a shows different steps of the method for data encryption according to one embodiment of the invention in a reduced flow chart.

We shall now describe the different steps of the method according to one embodiment of the invention with reference to the flow chart of FIG. 3a. When there is a need to encrypt data, one or more seed numbers are generated in the electronic device, for example three seed numbers RAND1, RAND2, RAND3, which are random numbers or pseudo random numbers. This is illustrated in block 301 in the flow chart of FIG. 3a. The seed numbers can be generated by a variety of principles in such a way that the seed numbers are as random as possible. The generated seed numbers are stored in a memory 1.2 in which is also stored the individual identifier IMSI read from the identification card 2 (block 302). The seed numbers RAND1, RAND2, RAND3 are transmitted 303 from the electronic device 1 to the identification card 2 via the identification card connection 1.3. Furthermore, the electronic device 1 transmits a command to the identification card 2 to compute the algorithm or controls the identification card 2 in another way to perform the computation of the algorithm for each of the seed numbers RAND1, RAND2, RAND3. The identification card 2 receives the seed numbers and computes the algorithm 304 to produce keys Kc1, Kc2, Kc3 corresponding to the seed numbers. The algorithm is, for example, the A8 algorithm used in the GSM system. In the computation of the algorithm, in addition to the seed number, an individual internal key Ki is used, which is stored in the memory 2.2 of the identification card. The internal key Ki corresponding to each subscriber identifier (IMSI) is stored in the authentication centre AuC of the GSM network, wherein the authentication centre can use the correct internal key Ki for each subscriber. The computation is carried out, for example, in the control block 2.1 of the identification card 2. As the result of the computation, one key is obtained for each seed number; thus, in this example, three keys Kc1, Kc2, Kc3 are obtained. Each key Kc1, Kc2, Kc3 is transmitted 305 to the electronic device 1. In the electronic device 1, these keys Kc1, Kc2, Kc3 are used to produce 306 an encryption key Ks to be used for data encryption, for example, by means of a unidirectional function. By means of the keys Kc1, Kc2, Kc3, the individual identification ID and possibly a password entered by the user, this unidirectional function forms an encryption key Ks. After this, the data can be encrypted, for example, in the following way.

The data to be stored is entered in the encryption algorithm, in which the encryption key Ks is used to form an encrypted data group, that is, to encrypt the data of the data group. The encryption algorithm is, for example, a symmetric encryption algorithm, wherein the original data can be determined by using the same key Ks for decryption. The encrypted data is stored 308 in the memory 1.3 of the electronic device 1. Furthermore, in connection with this data, data about the seed numbers and the individual identification is stored. If necessary, the seed numbers and the individual identifier can be stored in encrypted form, for example by means of a password defined by the user. In the data encryption, if necessary, it is possible to utilize the operating system functions of the electronic device 1, if these are installed in the electronic device 1. The operating system functions normally comprise file management functions, wherein the data group can be stored as a file, the operating system taking care of the date storage function. In a corresponding manner, the file can be retrieved to be used by means of the file functions. If only the seed numbers are encrypted by the user password, it is advantageous that the password defined by the user cannot be determined afterwards by so-called brute force or dictionary attacks, because the seed numbers to be encrypted are randomized. An attacker can thus not check if a guess of the password is successful, because random seed numbers do not directly tell whether the decryption has been successful or not.

Figure 3B:
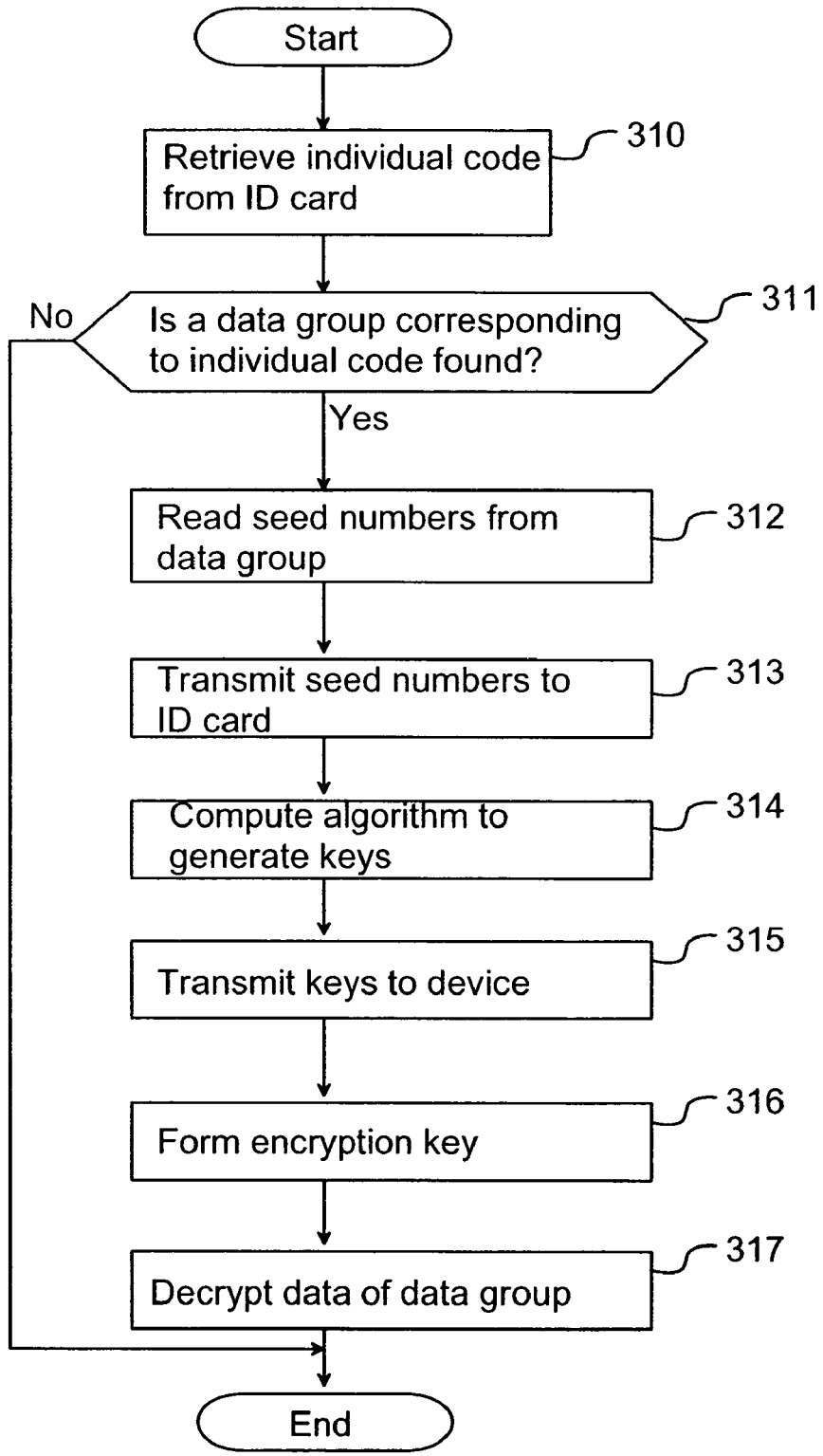
FIG. 3b shows different steps of the method for data decryption according to one embodiment of the invention in a reduced flow chart.

At the stage when the electronic device 1 has a need to process encrypted data in decrypted format, decryption is carried out, for example in the following way, with reference to the flow chart of FIG. 3b. In the electronic device 1, the individual identifier is read 310 from the identification card 2 into the memory 1.2 of the electronic device, if necessary. After this, it is examined 311 if a data group, such as a file, corresponding to the individual identifier is found in the memory 1.2. The data group can be searched for by means of the contents and/or header data (e.g. file name which may include an individual identifier). After the correct data group has been found, one or more seed numbers RAND1, RAND2, RAND3 used in connection with the encryption are read 312 from the data group.

If the seed numbers and possibly also the individual identifier have been encrypted in connection with the storage of the data group, this data is decrypted. To do this, the electronic device 1 e.g. requests the user to enter the password by which the seed numbers and the individual identifier can be decrypted.

At the stage when the individual identifier and the seed numbers are known, the seed numbers are transmitted 313 to the identification card 2 and the keys Kc1, Kc2, Kc3 corresponding to the seed numbers are computed 314 on the identification card 2, as presented above in connection with the encryption. The keys Kc1, Kc2, Kc3 are transmitted 315 to the electronic device 1, in which the keys and the individual identifier are used to form a key for decrypting the data group with the decryption algorithm corresponding to the encryption algorithm. In the case of symmetric encryption, the encryption algorithm and the decryption algorithm are the same.

If the electronic device 1 comprises an identification card 2 whose stored individual identifier matches with the individual identifier stored in connection with a data group, the data of this data group can be decrypted 317, after which the data of the data group is available in the electronic device 1.

If the electronic device 1 comprises an identification card 2 whose stored individual identifier does not match with the individual identifier stored in connection with any data group, no encrypted data group will be processed and the data will remain concealed. In this way, the invention makes it possible that by using a given identification card 2 in the electronic device 1, it is only possible to process such data groups encrypted according to the invention whose encryption has been performed when this identification card 2 was installed in the electronic device 1. The arrangement according to the invention also prevents that if a data group is copied from one electronic device 1 to another electronic device (not shown in the figures), the data group cannot be decrypted except by installing the correct identification card 2 in this second electronic device. In a system according to another embodiment of the invention, even this can be prevented by using, as one part of data for producing the encryption key Ks, the individual equipment identity of the electronic device 1, or the like. Consequently, this is a relatively efficient way of preventing the use of data of the same data group in several electronic devices 1 simultaneously.

In the system according to yet another embodiment of the invention, the keys Kc1, Kc2, Kc3 are also encrypted and stored in connection with the data group when the data group is encrypted. Thus, for the encryption of these keys, the same encryption key Ks is used, by which the other data of the data group, intended to be encrypted with a strong encryption, is encrypted. Thus, when processing the data of the data group, the keys Kc1, Kc2, Kc3 are produced on the identification card 2, and these and the individual identifier are used to compute the decryption key, as presented above. After this, before the actual encryption of the data in the data group, the keys stored in encrypted form in the data group are decrypted. The keys are compared with the keys Kc1, Kc2, Kc3 read from the identification card 2, and if the keys match, the other data of the data group can be decrypted. If the keys do not match, it is probable that the identification card 2 is not the same one that was used for the encryption of the data in the data group. By this arrangement, it is possible to reduce the risk that anyone could find out, for example by examining the operation of the electronic device 1, the keys Kc1, Kc2, Kc3 when the keys are processed in unencrypted form.

Consequently, the invention utilizes the identification card 2 which is equipped with one or more algorithms and which identification card 2 and algorithm are also used for another purpose, such as user authentication in the mobile communication network. However, to apply the invention, for example the user of a mobile station does not need to contact the operator of the mobile communication network, even though the identification card issued by said operator and the stored algorithm and other identification functions were utilized. In this sense, the system is independent of the operator.

The length of the seed numbers is selected so as to achieve a sufficiently effective encryption for each application. On the other hand, the length and the format of the seed number may be determined by the identification card 2. For example, it is possible to use a 128-bit seed number, but the invention is not limited to the use of 128-bit seed numbers only.

In one mobile communication system based on the CDMA technology, a so-called R UIM card is used in mobile stations, wherein the identification card of this type can also be used in connection with the present invention. Other non-restricting examples of identification cards to be mentioned include the USIM card of the UMTS mobile communication system, an electronic identification card, as well as a bank card and a credit card equipped with an identification circuit (so-called chip card). In these cases, the encryption key Ks is generated by using a derived value produced cryptographically from a seed value on the identification card 2. In all cases, the seed value does not need to be a random number, nor does the value formed on the card need to be an encryption key. In view of the invention, it is essential that the seed value formed by the electronic value 1 can be used on the identification card 2 to form a derived value which is computed by using the internal key Ki stored on the identification card 2. The internal key Ki may be a symmetric key or, in the case of asymmetric cryptography (of a public key), the internal key Ki may be the private key of a pair of keys stored on the identification card 2. For example, in the use of methods of a public key, the seed value can be an intelligible character string which contains, for example, a random or pseudo random part selected by the electronic device 1. This character string is encrypted or signed on the identification card 2 by using a private key stored on the identification card 2. The encrypted character string or digital signature returned by the identification card 2 thus functions as a derived value on the identification card 2, which can be further used for deriving an encryption key Ks. Also in this case, the derived value cannot be determined afterwards without having said identification card 2 available, wherein the data stored in encrypted form in the electronic device 1 is thus protected from copying and use.

Although it has been presented above that the encryption key Ks is formed by means of one or more keys Kc1, Kc2, Kc3 produced by the identification card 2 and the individual identifier ID, the encryption key Ks can be formed by using additionally, for example, an individual equipment identity, such as the IMEI (International Mobile Equipment Identifier), a local area network address possibly provided for the electronic device 1, such as a WLAN MAC address, a wireless short-range device address, such as a Bluetooth MAC address, etc.

The functions according to the present invention can be primarily implemented by software as program commands in the control block of the electronic device 1, for example in the processor. The invention can also be implemented as a module which is connected to the electronic device 1 to perform the desired functions.

Furthermore, it should be mentioned that the identification card 2 used in this invention does not necessarily need to be provided in the form of a card, but, in practice, the practical implementation of the identification card 2 may differ from the card format.

It will be obvious that the present invention is not limited solely to the above-presented embodiments but it can be modified within the scope of the appended claims.

What is claimed is:

1. A method for use by an electronic device of a mobile communication system, comprising
providing the electronic device with an identification card equipped with a cryptographic algorithm;
generating at least one seed value in the electronic device;
transmitting said at least one seed value to the identification card;
receiving at least one derived value from the identification card generated by the cryptographic algorithm with said at least one seed value as an input;
using said at least one derived value for producing an encryption key in said electronic device;
encrypting data to be stored with the encryption key to form encrypted data; and
storing said at least one seed value and an individual identification in connection with the encrypted data;
wherein a device-specific identification is stored in the electronic device, and wherein the device-specific identification of the electronic device is also used for the formation of said encryption key.

2. The method according to claim 1, wherein the identification card is provided with an internal key, wherein said internal key is also used in the formation of said encryption key.

3. The method according to claim 2, wherein in the formation of said encryption key, a unidirectional function is used, said at least one derived value and said internal key being used as the input.

4. The method according to claim 2, wherein for decrypting the data in a data group, a decryption key is formed, for whose formation the data of the data group is searched for data about at least one seed value used in the encryption step, said at least one seed value is transmitted to the identification card, in which said cryptographic algorithm is performed, said seed value and said internal key being used as the input, wherein in the cryptographic algorithm, at least one of said at least one derived value is formed, and said at least one derived value is transmitted to the electronic device, wherein said at least one derived value is used for producing said decryption key.

5. The method according to claim 4, wherein the electronic device is provided with two or more stored data groups, and each data group is provided with stored information about an individual identifier, wherein at the stage of decryption of the data, said data groups are searched for the data group whose individual identifier matches with the internal key stored on the identification card, and if the data group was found, the data of the found data group is decrypted.

6. The method according to claim 1, wherein the identification card used is an identification card used for identifying mobile stations of a mobile communication system, wherein said cryptographic algorithm used is the algorithm used for identifying a mobile station.

7. The method according to claim 1, wherein the identification card used is at least one of the following:
a subscriber identity module card,
a USIM card,
an R-UIM card,
an electronic identification card,
a bank card,
a credit card.

8. The method according to claim 1, wherein at least a part of the seed value is formed in a random or pseudo random way.

9. An electronic device of a mobile communication system, comprising a memory and an identification card connection and provided with an identification card equipped with a cryptographic algorithm, wherein the electronic device is configured to generate at least one seed value, to transmit said at least one seed value to the identification card, said identification card is configured to perform said cryptographic algorithm, said at least one seed value is arranged to be used as an input, wherein in the cryptographic algorithm, at least one derived value is arranged to be formed, and the electronic device is configured to receive said at least one derived value and to use said at least one derived value in the formation of said encryption key, configured to encrypt data with the encryption key to form encrypted data; configured to store the encrypted data, and configured to store said at least one seed value and an individual identification in connection with the encrypted data, wherein an equipment specific identification is stored in the electronic device, wherein the equipment specific identification of the electronic device is also configured to be used in the formation of said encryption key.

10. The electronic device according to claim 9, wherein the identification card is provided with an internal key, wherein said internal key is also arranged to be used in the formation of said encryption key.

11. The electronic device according to claim 10, wherein in the formation of said encryption key, a unidirectional function is configured to be used, said at least one derived value and said internal key being used as the input.

12. The electronic device according to claim 10, wherein it is configured to form a decryption key to be used in the decryption of data of a data group, to search the data of the data group for data about at least one seed value used at the encryption stage, to transmit said at least one seed value to the identification card in which said cryptographic algorithm is arranged to be performed, said at least one seed value and said internal key being arranged to be used as the input, wherein at least one of said at least one derived value is arranged to be used in the algorithm, wherein the device is configured to receive said at least one derived value from the identification card, wherein said at least one of said at least one derived value is configured to be used in the formation of said decryption key.

13. The electronic device according to claim 12, wherein two or more data groups are stored in the device, and data about the internal key is stored in connection with each data group, wherein the device is configured to search said data groups for the data group whose individual identifier matches with the internal key stored on the identification card, to decrypt the data of the data group.

14. The electronic device according to claim 9, wherein the identification card is an identification card used for identifying mobile stations of a mobile communication system, wherein said cryptographic algorithm is the algorithm used for identifying a mobile station.

15. The electronic device according to claim 9, wherein the identification card is one of the following:
a subscriber identity module card,
a USIM card,
an R-UIM card,
an electronic identification card,
bank card,
a credit card.

16. A control block configured to control at least one function of an electronic device of a mobile communication system, which electronic device comprises an identification card connection and is provided with an identification card equipped with a cryptographic algorithm, wherein the control block comprises
a seed generator configured to generate at least one seed value,
an output configured to transmit said at least one seed value to the identification card, an input configured to receive at least one derived value generated by said identification card by said cryptographic algorithm by using said seed value as an input to form at least one derived value, and
a key generator configured to use said at least one derived value in the formation of said encryption key, and
an encrypting element configured to encrypt data with the encryption key to form encrypted data; wherein the control block is configured to store the encrypted data, and configured to store at least one seed value and an individual identification in connection with the encrypted data;
wherein a device-specific identification is stored in the electronic device, and wherein the device-specific identification of the electronic device is also used for the formation of said encryption key.

17. A computer readable medium having application software embodied therein for use in an electronic device of a mobile communication system which comprises machine-executable program commands stored on a readable medium for execution by a processor, the machine-executable program commands:
for encrypting data to be stored with an encryption key to form encrypted data, and
for storing at least one seed value and an individual identification in connection with the encrypted data in a memory of the electronic device,
and which electronic device is provided with an identification card equipped with a cryptographic algorithm, wherein the application software comprises machine executable program commands:
for generating at least one seed value,
for searching the data of a data group for information about said at least one seed value used at the encryption stage,
for transmitting said at least one seed value to the identification card in which said cryptographic algorithm is arranged to be used, said at least one seed value being arranged to be used as an input, wherein at least one derived value is arranged to be formed in the algorithm,
wherein the application software comprises machine-executable program commands:
for receiving said at least one derived value from the identification card, and
for using said at least one derived value in the formation of said decryption key;
wherein a device-specific identification is stored in the electronic device, and
wherein the device-specific identification of the electronic device is also used for the formation of said encryption key.

18. The computer readable medium according to claim 17, wherein for decrypting the data of the data group, the application software comprises machine executable program commands:
for searching the data of the data group for information about said at least one seed value used at the encryption stage,
for transmitting said at least one seed value to the identification card, in which said cryptographic algorithm is used, said at least one seed value being used as the input, wherein at least one derived value is formed in the algorithm,
wherein the application software comprises machine-executable program commands:
for receiving said at least one derived value from the identification card, and
for using at least one of said at least one derived value in the formation of said decryption key, and
for decrypting the data group with said decryption key.

19. The computer readable medium according to claim 18, wherein the electronic device is provided with two or more stored data groups, and each data group is provided with stored information about an internal key, wherein the application software comprises machine executable program commands for searching said data groups for the data group whose individual identifier matches with the internal key stored on the identification card, and if the data group is found, the data of the found data group is decrypted.

20. An electronic device of a mobile communication system, comprising a memory and an identification card connection and provided with an identification card equipped with a cryptographic algorithm, wherein the electronic device comprises means for generating at least one seed value, means for transmitting said at least one seed value to the identification card equipped with means for performing said cryptographic algorithm, said at least one seed value arranged to being used as an input, wherein in the cryptographic algorithm, at least one derived value is arranged to be formed, and the electronic device comprises means for receiving said at least one derived value and means for using said at least one derived value in the formation of said encryption key, means for encrypting data with the encryption key to form encrypted data and means for storing the encrypted data, and said at least one seed value and an individual identification in connection with the encrypted data, wherein a device-specific identification is stored in the electronic device, and wherein the device-specific identification of the electronic device is also used for the formation of said encryption key.

* * * * *